Dec. 1, 1931.  P. B. CAMP  1,834,576
SLACK ADJUSTER FOR RAILWAY CAR BRAKES
Original Filed Jan. 30, 1929  2 Sheets-Sheet 1
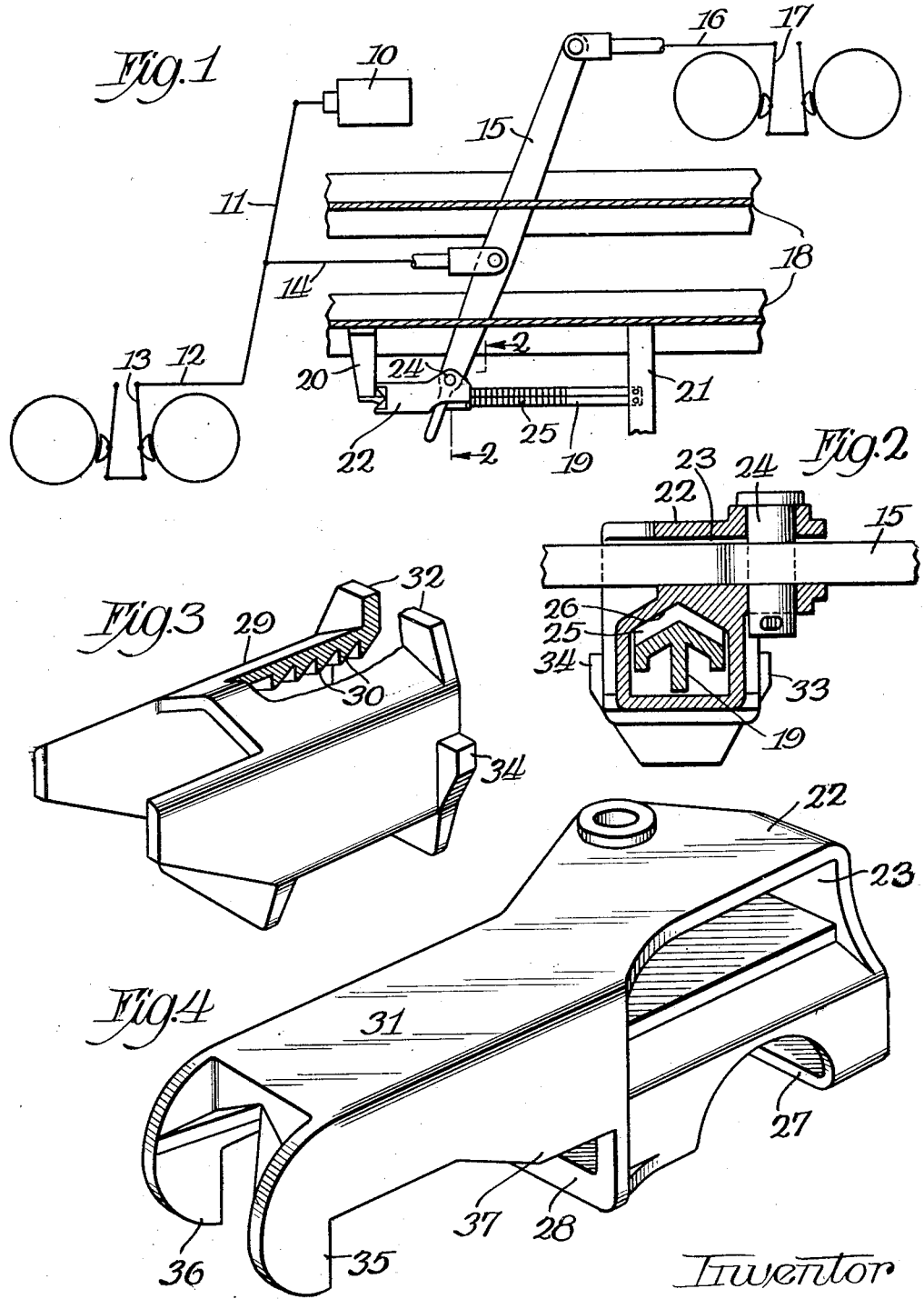
Inventor
Percy B. Camp
By Gilson, Mann & Roy
Attys.

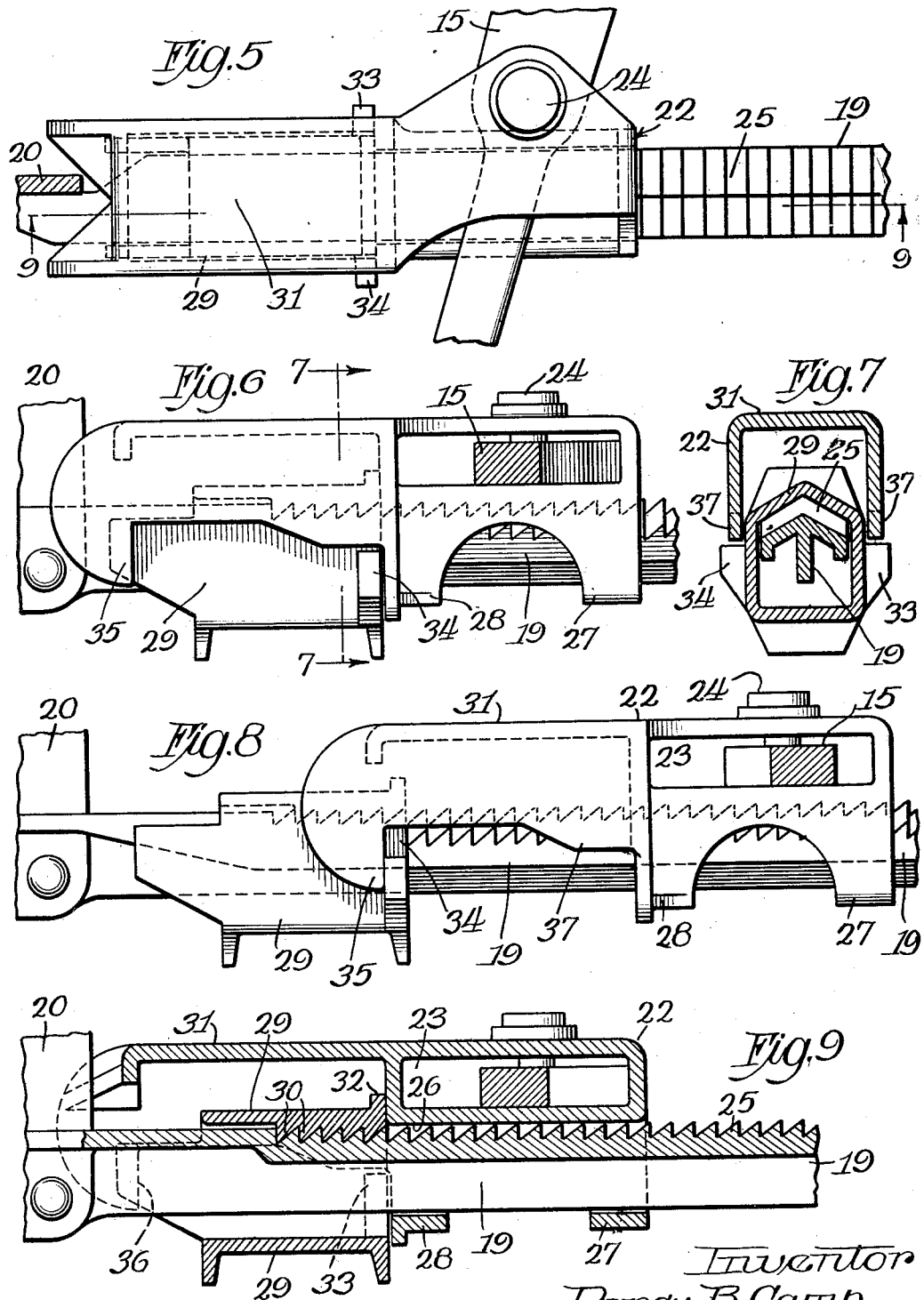

Patented Dec. 1, 1931

1,834,576

UNITED STATES PATENT OFFICE

PERCY B. CAMP, OF MAYWOOD, ILLINOIS, ASSIGNOR TO UNIVERSAL DRAFT GEAR ATTACHMENT CO., A CORPORATION OF ILLINOIS

SLACK ADJUSTER FOR RAILWAY CAR BRAKES

Application filed January 30, 1929, Serial No. 336,071. Renewed October 29, 1930.

The invention relates to devices for taking up the slack in railway car brake systems which develops by reason of the wear of the parts, and it consists in a structure such as hereinafter described, and as illustrated in the accompanying drawings in which, Fig. 1 is a diagrammatic view of the framing of a railway car and its brake system, the invention being shown in plan;

Fig. 2 is a detail section on the line 2—2 of Fig. 1;

Fig. 3 is a view in perspective, partly in section, of a buttress element forming a part of the device;

Fig. 4 is a view in perspective of the brake lever fulcrum block;

Fig. 5 is a detail plan view of the device applied to a railway car, a portion of the latter being shown in section, the parts being shown in service position;

Fig. 6 is a detail side elevation of the device applied to a railway car, an element of the brake system being shown in section, the parts being in service position;

Fig. 7 is a sectional view on the line 7—7 of Fig. 6;

Fig. 8 is a view similar to Fig. 6, the parts of the device being positioned as during the slack adjusting operation; and Fig. 9 is a detail section on the line 9—9 of Fig. 5.

The improved device is generally applicable, without regard to the particular arrangement of the brake system of a car, but is shown in connection with a system comprising an air cylinder 10, the piston of which is applied to a live lever 11, connected by means of a link 12 with one of the truck levers 13, the lever 11 being also connected by means of a link 14 with a dead lever 15 of the brake system which in turn is connected by means of a link 16 with a truck lever 17 of another truck of the car.

A pair of car sills is represented at 18, to one of which a ratchet bar 19 is secured as by means of brackets 20, 21.

A dead lever fulcrum block 22 is slidably mounted on the bar 19 and is provided with a transverse aperture 23 for accommodating and permitting swinging movement of the dead lever 15 which is pivoted upon this block by means of a pin 24. The upper face of the bar 19 is downwardly inclined in both directions from its longitudinal median line, each inclined portion being provided with a series of ratchet teeth as shown at 25 which face backwardly from the direction of stress through the link 14 in brake application.

The fulcrum block 22 is provided with a face 26 which seats upon and has sliding engagement with the apexes of the teeth 25 as indicated in Fig. 2. This block is also provided with a pair of stirrups or loops 27, 28 which loosely enclose the bar 19.

A buttress 29, longitudinally apertured, is sleeved upon the bar 19, its upper wall conforming in shape to the upper surface of this bar and being provided with two series of forwardly facing ratchet teeth as indicated at 30, which cooperate with the ratchet teeth of the bar. A forward extension 31 from the upper portion of the fulcrum block 22 covers and overlaps the buttress 29.

In service position and as illustrated in Figs. 5, 6 and 9, the forward face of the body portion of the fulcrum block 22 engages the rearward face of the buttress 29, which latter face may be somewhat extended by means of an upstanding lug 32, whereby the fulcrum block is held against forward movement under brake application stresses, these stresses being communicated to the bar 19 through the buttress.

A pair of lateral lugs 33, 34 at the rear end of the buttress 29 are engageable by a pair of hooks or lugs 35, 36 depending from the forward end of the side walls of the extension 31 of the fulcrum block when the latter is moved backwardly in the brake readjusting operation, these cooperating lugs being spaced apart, when the device is in service position, a distance corresponding to the normal slack of the brake system.

When the slack becomes excessive, thereby requiring an objectionable and abnormal lengthening of the stroke of the air cylinder piston, the fulcrum block 22 is repositioned on the bar 19 to eliminate this excess. This repositioning is accomplished by manually swinging the lever 15 to the right to bring the brake shoes snugly against the wheels. During this movement, the buttress 29 remains stationary until the lugs 35, 36 come into engagement with the lugs 33, 34, this engagement occurring when the fulcrum block has been moved a distance corresponding with the normal brake slack. Further movement of the lever to the right carries with it the buttress for a distance corresponding with the excess of slack. The brake lever being now released, is permitted to swing forwardly as the brake shoes move away from the wheels, carrying with it the fulcrum block 22 until the forward end of the body portion thereof again comes into contact with the buttress, which has now been anchored in a new position, this contact occurring when the shoes have receded from the wheels the normal distance. Subsequent brake applications, therefore, require only a normal or intended range of travel of the air cylinder piston. In order to prevent the teeth of the buttress from being jarred out of engagement with the teeth of the ratchet bar, the rearward portions of the side walls of the forward extension 31 of the fulcrum block are extended downwardly as indicated at 37 sufficiently to ride upon the lugs 33, 34 as the fulcrum block recedes after the resetting operation.

Various changes of details of the device may be made within the scope of the invention.

I claim as my invention:

1. A slack adjuster for car brake systems comprising a bar having a series of ratchet teeth on its upper face, a fulcrum block slidably mounted on the bar, means for pivotally attaching a brake lever to the fulcrum block, a buttress mounted upon the bar, and having ratchet teeth cooperating with the teeth thereof and being engageable by the fulcrum block on brake applications, and lug means carried by the fulcrum block for moving the buttress backwardly on the bar.

2. A slack adjuster for car brake systems comprising a bar having a series of ratchet teeth on its upper face, a fulcrum block slidable upon the bar, means for pivoting a brake lever to such block, a buttress mounted upon the bar and having teeth engageable with the teeth thereof and forming a limiting stop for the fulcrum block when under brake application stresses, a forwardly facing lug carried by the buttress, a backwardly facing lug carried by the fulcrum block for engaging the first named lug, such cooperating lugs being normally spaced apart a distance corresponding with normal brake slack.

3. A slack adjuster for car brake systems comprising a bar having a series of ratchet teeth on its upper face, a fulcrum block slidable upon the bar, means for pivoting a brake lever to such block, a buttress mounted upon the bar and having teeth engageable with the teeth thereof and forming a limiting stop for the fulcrum block when under brake application stresses, a forwardly facing lug carried by the buttress, a backwardly facing lug carried by the fulcrum block for engaging the first named lug, such cooperating lugs being normally spaced apart a distance corresponding with normal brake slack, and means carried by the fulcrum block for locking the buttress in engagement with the bar.

4. A slack adjuster for car brake systems comprising a fixed bar having backwardly facing ratchet teeth on its upper face, a fulcrum block slidably seated on the apexes of the teeth, a buttress cooperating with the bar teeth and forming a limiting stop for the fulcrum block, and lug means carried by the fulcrum block for engaging a forwardly facing portion of the buttress and being normally spaced therefrom.

5. A slack adjuster for car brake systems comprising a fixed bar having ratchet teeth on its upper face, a fulcrum block slidably sleeved upon the bar and having forwardly facing shoulders, and an extension projecting forwardly from such shoulders and having at its forward end a pair of depending backwardly facing shoulders, a buttress mounted upon and cooperating with the teeth of the bar and being engageable with the fulcrum block, and having a pair of lateral projecting forwardly and upwardly facing shoulders at its rearward end engageable by the depending shoulders of the fulcrum block extension, such extension having adjacent its rearward end depending flanges for engaging the upper faces of the named shoulders of the buttress.

In testimony whereof I affix my signature.

PERCY B. CAMP.